May 22, 1945.    J. P. FERGUSON    2,376,762
WELDING METHOD AND APPARATUS
Filed Jan. 26, 1943
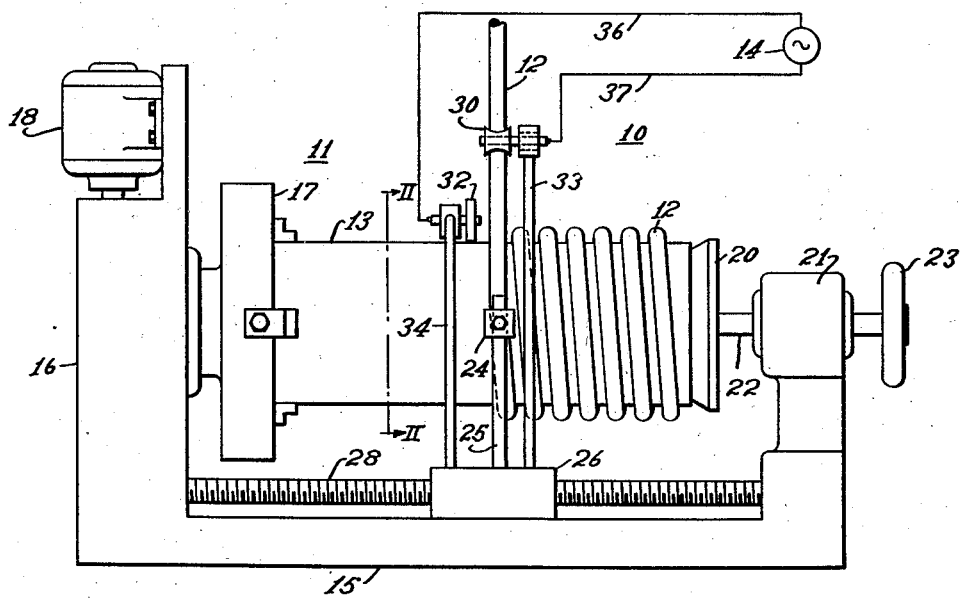
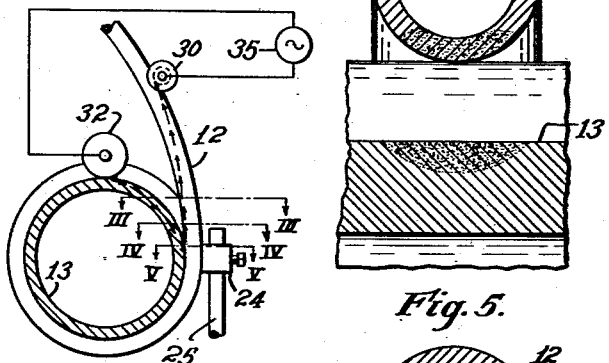
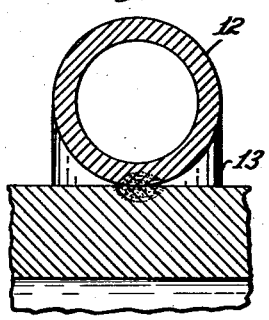
WITNESSES:
Edward Michaels
F. V. Giolma
INVENTOR
John P. Ferguson.
BY
ATTORNEY Patented May 22, 1945

2,376,762

UNITED STATES PATENT OFFICE 2,376,762

WELDING METHOD AND APPARATUS

John P. Ferguson, San Francisco, Calif., assignor to Westinghouse Electric & Manufacturing Company, East Pittsburgh, Pa., a corporation of Pennsylvania Application January 26, 1943, Serial No. 473,594

5 Claims. (Cl. 219—10)

My invention relates, generally, to welding and it has reference in particular to a method of and apparatus for induction resistance welding with relatively high frequency currents.

Generally stated, it is an object of my invention to provide for induction resistance welding members in a simple and effective manner utilizing the proximity effects of high frequency currents.

More specifically, it is an object of my invention to provide for welding members by progressively bringing them into contact and pass a relatively high frequency current through adjacent portions of the members in advance of the point of contact in opposite directions so as to utilize the proximity effect of said current to secure concentration of the current adjacent the point or area of contact.

It is also an object of my invention to provide for utilizing the proximity effect of relatively high frequency currents in welding, brazing, soldering or the like, to secure localized heating of the members immediately adjacent the point or area of contact.

Another object of my invention is to provide for conducting a relatively high frequency current through portions of members to be joined in opposite directions adjacent the point or area of contact so as to effect concentration of the current at the adjacent surfaces of the members to produce increased heating of the adjacent portions.

It is an important object of my invention to provide for progressively securing a metal tube about a metal container by wrapping the tube about the container, conducting relatively high frequency current through portions of the tube and the container in advance of the point of contact and applying pressure at the point of contact to weld the tube to the container.

Other objects will in part be obvious, and will in part be explained hereinafter.

In practicing my invention the parts to be joined together are positioned in gradually converging relation so that portions thereof adjacent the points of convergence are relatively close together and pressure is applied at the point of convergence to provide a predetermined contact pressure between the parts. Connection to the parts to be joined is made at points in advance of the point or area of contact or convergence and a relatively high frequency current is passed therefrom through one part toward the point of contact and through the other part away from the point of contact in the opposite direction. The point of contact and the points of connection are progressively advanced as the parts become united, and the proximity effect of the high frequency current flowing through each of the parts in opposite directions produces concentrations of the current in the other part so that localized heating is secured at the adjacent surfaces whereby union of the members is more efficiently effected.

For a more complete understanding of the nature and scope of my invention reference may be had to the following detailed description which may be read in connection with the accompanying drawing, in which:

Figure 1 illustrates diagrammatically resistance welding apparatus embodying the principal features of the invention;

Fig. 2 is a sectional view taken along the line II—II of Fig. 1;

Fig. 3 is an enlarged partial cross-sectional view taken along the line III—III of Fig. 2;

Fig. 4 is an enlarged partial cross-sectional view taken along the line IV—IV of Fig. 2; and Fig. 5 is an enlarged partial cross-sectional view taken along the line V—V of Fig. 2.

Referring to Figs. 1 and 2, the reference numeral 10 may denote generally a resistance welding system comprising, generally, welding apparatus 11 for welding an elongated pipe or conductor 12 to a tank or container 13, and a source of welding current 14.

The resistance welding apparatus 11 may, for example, comprise a machine such as a lathe having a bed 15 with a head 16 at one end provided with a suitable chuck 17 for rotatably supporting one end of the container 13 and a driving motor 18 for rotating the chuck. Suitable means may be provided at the other end of the bed 15 for supporting the other end of the container 13, such as the center plate 20, which may be rotatably and adjustably mounted on a support 21 by means of a shaft 22 and handwheel 23.

The tube 12 may be supplied in any suitable manner such as from a reel or drum (not shown) and directed relative to the container 13 so that it is inclined at a predetermined angle to the longitudinal axis of the container, and so that it also converges gradually towards the surface of the container. Suitable means may be provided for applying a predetermined contact pressure between the tube 12 and the container 13 such as the guide member 24 which may be positioned at the point of convergence of the tube and container substantially in line with the longitudinal axis of the container.

In order to provide for securing the tube 12 to the container 13 in a uniform helix, means may be provided for moving the guide member along the longitudinal axis of the container as the tube 12 is wrapped about the container. The guide member 24, may for example, be mounted by means of a support 25 on a base 26 driven by means of a screw 28 actuated by the driving motor 18 which drives the chuck 17.

In order to secure the most effective heating of the tube and container for welding, brazing or soldering them together, I propose to pass a relatively high frequency current through portions of the tube and container in such a manner as to effectively utilize the proximity effects of high frequency currents to localize at adjacent portions of conductors conducting current in opposite directions, thus increasing the current density and increasing the heating by the high frequency current of adjacent portions of the tube and container. In order to secure this result the tube 12 is preferably directed towards the point of contact at a relatively small angle to the surface of the container so that adjacent portions of the tube and container in advance of the point of contact are relatively close and generally parallel to each other. Electrical connection may be made with the tube 12 and the container 13 at suitable distances in advance of the point of contact which occurs at the guide member 24, by contact means such as the contact members 30 and 32.

In order to provide for progressively welding the tube to the container, the contact members 30 and 32 may be supported on the base 26 by means of support members 33 and 34 so that they may be moved longitudinally along the container in accordance with rotation of the container and movement of the guide member 24. The contact members 30 and 32 may be connected by conductors 36 and 37 to the source 14, which is preferably of a relatively high frequency such as, for example, 960, 2400 or 4800.

When the container 13 is rotated, the guide member 24 moves progressively along the container so that the tube 12 is progressively wrapped about the container in a uniform helix. As shown in Fig. 2, the relatively high frequency current from the generator 35 passes from the contact member 32 through a portion of the container in advance of the point of contact at the guide member 24 and thence through the tube along a path gradually diverging from the current path through the container to the contact member 30. Because of the proximity effect of the relatively high frequency current flowing through the adjacent paths in the container and the tube in substantially opposite directions, localization or concentration of the current is caused adjacent the point of contact.

For example, as shown in Fig. 3, the current concentration in the tube 12 and the surface of the container 13 at a point relatively remote from the point of contact is relatively low as represented by the shaded areas, since the distance between the paths is relatively large and the proximity effect is relatively small. At an intermediate point the current concentration becomes more noticeable. As shown by the shaded areas in Fig. 4 the proximity effect of the oppositely flowing current in the tube 12 and container 13 causes localization of the current in the portions of the tube and container immediately adjacent each other. The current paths are thus reduced in cross-section so that the heating effect of the current is greatly increased. This concentration of current increases to a maximum at the point of contact where the current paths are reduced to a minimum.

As shown by the shaded areas in Fig. 5, the current paths have a relatively small cross-section immediately adjacent the point of contact, and the heating effect of the current is therefore at a maximum so that union of the tube and container is more readily effected at the point of contact or convergence.

From the above description it will be apparent that I have provided in a simple and effective manner for securing a tube or other conductor to a container or body member either by welding, brazing or soldering. By utilizing the proximity effect of the relatively high frequency current, increased heating may be produced for the same welding current or the same heat may be produced with a lower welding current, since the heating effect is localized where it is most needed and little or no heat is utilized in useless heating of portions of the members which are not to be joined together. An increase in current in one of the members being joined induces electric forces in the other and in the direction of current increase therein. In a like manner current increases in the other member produces assisting electric forces in the said one, utilizing the proximity effect to the highest degree.

Since my invention may be readily practiced without requiring expensive or complicated apparatus it is readily adaptable to many different types of machines such as lathes and the like which are in common use. The cost of welding may thus be greatly reduced by using my invention.

Since certain changes may be made in the above description and different embodiments of the invention may be made without departing from the spirit thereof, it is intended that all the matter contained in the above description or shown in the accompanying drawing shall be considered as illustrative and not in a limiting sense.

I claim as my invention:

1. Welding apparatus for securing a metal tube to a metal body member comprising, means to position the metal body for rotation about an axis, means for feeding the tube in a helix about the body member including movable guide means positionable to progressively direct the tube against the body member substantially transversely of said axis and at an acute angle to the surface of the member to provide a point of contact therewith, and a plurality of current collecting means associated with and movable with the guide means engaging the body member and the tube at points removed from and on the same side of the point of contact to provide for passing a relatively high frequency current through adjacent portions of the tube and body member in series circuit relation to provide current flow in the members in opposite directions so as to utilize the proximity effect of said current to localize the current paths in the members adjacent the point of contact.

2. Proximity welding apparatus for progressively securing an elongated conductor about a body member comprising, means to rotatably support the body member, guide means operable to progressively urge the elongated conductor against the body member at an acute angle relative to the surface thereof to provide a contact point therewith, contact means engaging the body member and elongated conductor in advance of the contact point and movable in unison to provide gradually convergent current paths, and circuit means connecting the contact means to a source of relatively high frequency current to pass the current from one contact means to the other through the conductor and body member in series circuit relation so as to provide current flow in opposite directions in the conductor and body member to effect concentration of the high frequency current adjacent the point of contact.

3. Welding apparatus for securing an elongated metal tube helically about a metal cylinder comprising, means to support the cylinder having driving means to rotate it about its longitudinal axis, guide means engaging the tube to support it in angular relation with and to bias it against the cylinder and provide a point of contact therebetween, said guide means being movable longitudinally of the cylinder in accordance with the operation of the driving means to space successive turns of the tube on the cylinder, contact means engaging the cylinder in advance of the point of contact substantially in alinement with the tube and movable with the guide means longitudinally of the cylinder, additional contact means engaging the tube in advance of the point of contact and movable with the aforesaid contact means, and circuit means connecting the contact means to a source of relatively high frequency current to provide relatively closely positioned opposed converging current paths through portions of the tube and cylinder in advance of the point of contact for utilizing the proximity effect of the high frequency current to effect a concentration thereof at the point of contact.

4. A method of progressively joining a relatively thin-walled metal tube to a relatively thick metal part which comprises, positioning the tube and part in gradually converging relation, applying pressure to provide a point of contact therebetween substantially at the point of convergence, conducting a relatively high frequency current through the tube and part between points thereon removed from the contact point and on the same side thereof and through the contact point in series circuit relation so as to provide acutely convergent current paths, and progressively advancing the points of pressure application and current conduction in predetermined spaced relation so as to utilize the proximity effect of the high frequency current in the acutely convergent paths to provide a concentration of localized heating in the side of the thin-walled tube adjacent the point of contact, whereby sufficient heat may be produced at the point of convergence to effect a joinder of the tube and part without overheating the tube in advance of said point.

5. The method of welding a relatively thin-walled tube of relatively high conductivity about a conductive body member which comprises, positioning the tube adjacent to and in gradually converging relation to the surface of the body member at a predetermined pitch angle to the longitudinal axis of the body member, applying pressure between the tube and the body member at the point of convergence to provide a definite contact point therebetween, conducting a relatively high frequency current through the converging portions of the body member and tube and the point of convergence in series circuit relation so as to provide current flow in opposite directions from points in advance of the contact point so as to utilize the proximity effect to secure concentration of the current in the wall portion of the tube only on the side adjacent the surface portion of the body member and adjacent the point of contact of the tube and body member, and progressively advancing the points of pressure application and the points of current conduction longitudinally of the body member to maintain a predetermined spaced relation therebetween.

JOHN P. FERGUSON.